United States Patent

Uhlig

[15] 3,695,109
[45] Oct. 3, 1972

[54] METHOD AND APPARATUS FOR DEFLASHING PLASTIC ARTICLES

[72] Inventor: Albert R. Uhlig, Toledo, Ohio 43613

[73] Assignee: Owens-Illinois, Inc.

[22] Filed: June 26, 1970

[21] Appl. No.: 50,194

[52] U.S. Cl. ..........................83/37, 18/5 BS, 83/40, 83/52, 83/117, 83/323, 83/346, 83/391, 83/419, 83/430, 83/513, 83/667, 83/914
[51] Int. Cl. ............................................B26d 11/00
[58] Field of Search..........83/343, 914, 37, 117, 331, 83/345, 37, 40, 52, 391, 419, 430, 513, 346, 323, 322, 667, 914, 278; 18/5 BS

[56] References Cited

UNITED STATES PATENTS

| | | |
|---|---|---|
| 419,835 | 1/1890 | Crowell.......................83/323 |
| 1,941,754 | 2/1934 | Quick et al..................83/323 |
| 1,969,579 | 8/1934 | Rippel.....................83/914 X |
| 2,145,048 | 1/1939 | Hagen.....................83/343 X |
| 3,253,544 | 5/1966 | Von Hofe................83/278 X |
| 3,388,626 | 6/1968 | Larson....................83/914 X |
| 3,479,694 | 11/1969 | Winstead................83/914 X |

*Primary Examiner*—Frank T. Yost
*Attorney*—David R. Birchall and Edward J. Holler

[57] ABSTRACT

This invention relates to the removal of unwanted flash material from the seam areas of plastic articles such as handle containing bottles. A rolling cutter is employed and is synchronized with the movement of the containers so that the cutting knives enter the handle portion of the bottle and remove the flash material therefrom.

10 Claims, 4 Drawing Figures

PATENTED OCT 3 1972  3,695,109

INVENTOR.
ALBERT R. UHLIG
BY D. R. Birchall
E. J. Holler
ATTORNEYS

METHOD AND APPARATUS FOR DEFLASHING PLASTIC ARTICLES

The present invention relates to the removal of unwanted flash material from plastic articles, more particularly the present invention relates to a cutting device for the removal of flash material in and around the handle portion of a plastic bottle.

During the manufacture of plastic articles such as containers for the merchandising of, for example, chlorinated water and other fluids, it is common practice to produce the containers by the well-known blow mold process. The blow mold process lends itself quite well to the manufacture of containers with an integrally produced handle. In forming a container by the blow mold process, a parison of plastic material is created by extruding a tubular section of plastic material. The section of extruded plastic material is then confined within the interior of a split mold. Air is then introduced into the parison to expand it into conformity with the interior of the mold. The mold is completely closed thus forming the handle portion of the container.

As a result of the above-described technique of bottle manufacture, the section between the handle and the bottle contains a web of plastic material corresponding in thickness to two layers of the original parison. Also there is generally an unwanted plastic section known as the moil attached to the container at the location where the inflating air was introduced into the container during the parison stage.

The present invention sets forth a new and novel apparatus and method of removing the unwanted flash and moil material from a container such as the one heretofore described.

It can be appreciated that it is difficult to deflash a container or bottle that contains an integral handle. It is recognized that plastic bottles are quite light and easily deformable, therefore, it is difficult to maintain an adequate grasp on the bottle while the unwanted material is removed therefrom. Then, too, it is important to remove the flash and moile completely so that the closure can be affixed to the container. Particularly, the flash in the handle area must be removed completely so that cuts will not occur when the filled container is picked up.

The present invention comprises a pair of rotating drums through which the bottles are fed one at a time. One of the rotating drums carrys a set of cutting surfaces while the other drum contains a flash support. The moil portion is removed simultaneously with the removal of the extraneous material from within and around the handle area.

It is the object of the present invention to provide an accurate and positive apparatus for the removal of unwanted material from a plastic article.

A further object of this invention is to provide a method utilizing a scissor-type rolling cut for deflashing a plastic article.

An additional object of the invention is to eliminate impact removal of the flash material and substitute therefore a rolling action.

Another object of the present invention is to utilize the flash material that is attached to the container for conveying the container in the vicinity of the cutting apparatus.

The exact nature of the present invention and other objects, advantages and features will be readily apparent from consideration of the following description with reference to the included drawings in which.

Very briefly, the present invention involves a set of rotating drums equipped with cutting surfaces that remove the moil as well as the flash within and around the handle portion of a plastic container.

Figure 1:
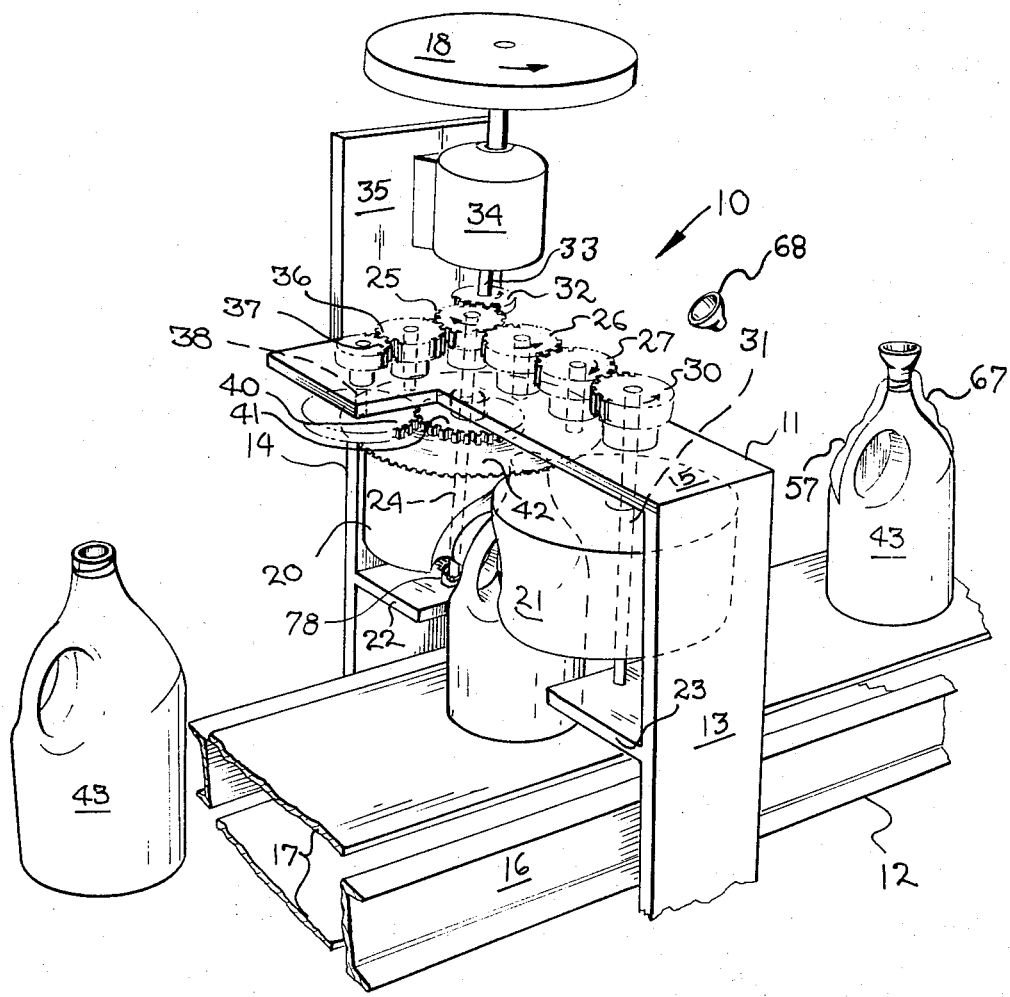
FIG. 1 is a perspective view of the apparatus including a conveyor system for conveying containers to and from the cutting drums.

Referring to FIG. 1, the overall apparatus is shown at 10.

A frame 11 for the support of the cutting mechanism is mounted over a conveyor 12 which is used to transport the bottles to and away from apparatus 10. Frame 11 has two upright side columns 13 and 14 that are arranged one on each side of conveyor 12. Interconnected between columns 13 and 14 is horizontally disposed frame member 15. Frame member 15 ties together columns 13 and 14 for rigidity and also serves as a bearing support for the cutting apparatus hereinafter described.

Conveyor 12 passes through and between columns 13 and 14. Conveyor 12 is of the continuous type and is supported from conveyor framework 16. The conveyor web or belt 17 is of conventional construction and can be fabricated from any material such as metal or elastomeric substances.

Returning now to columns 13, 14 and horizontal member 15, a pair of drums 20 and 21 which contain cutting surfaces are positioned adjacent each other for synchronous rotation. Drum 20 is journaled between horizontal member 15 and cantilevered plate 22 which is attached to side column 14. In a similar manner, drum 21 is journaled between horizontal member 15 and plate 23. Drums 20 and 21 are spaced one from the other and have their axes of rotation parallel to one another and aligned in a substantially vertical direction. Drum 20 is mounted on shaft 24 and drum 21 is mounted on shaft 31.

The top of the shaft 24 contains gear 25 securely anchored thereto so that there is no slippage between gear 25, shaft 24, and drum 20. Gear 25 is connected to idler gears 26 and 27 which are mounted for rotation from stub shafts cantilevered in an upward direction from horizontally disposed framework 15. Gear 27 meshes with gear 30 which is affixed to the top of shaft 31. Shaft 31 is similar to shaft 24 in that it carries drum 21 in rotatable fashion.

A power source is coupled to gear 25. Drive gear 32 is attached to the end of motor shaft 33 which in turn is rotationally driven by motor 34. Motor 34 which is anchored to motor base 35, can be of the variable speed type thus controlling the rate of flow of containers through the apparatus. Motor driven gear 32 meshes with previously mentioned gear 25. If desirable, a flywheel such as 18 can be attached directly to the armature of motor 34. The flywheel 18 will provide a smoother operation of the overall apparatus because of the energy it is capable of storing for expenditure at the time of actual severing the plastic material. If desired, flywheel 18 can be replaced by increasing the mass of drums 20 and 21. In this manner, the intermittent motion caused by the actual cutting can be overcome.

Thus it can be seen that as motor 34 revolves, drums 20 and 21 will also rotate in direct relationship one with the other. The utilization of a pair of idler gears such as 26 and 27 assures that drums 20 and 21 rotate in opposite directions. It will of course be understood that the heretofore described mode of achieving different directions of rotation in drums 20 and 21 could be achieved in other ways. For example, gear 25 and gear 30 could be increased in diameter and meshed together thus causing drums 20 and 21 to rotate in opposite directions.

Also connected with gear 25 is auxiliary gear 36 which is spindled from a shaft mounted on horizontal member 15. Gear 36 is meshed with gear 37. Gear 37 is attached to the end of shaft 38. Shaft 38 is journaled in horizontal member 15 and has gear 40 attached to the bottom end. Gear 40 is in turn coupled with gear 41. Gear 41 is journaled about shaft 24 and is not rigidly affixed thereto. A circular knife or saw 42 is anchored to gear 41. By controlling the diameters of gears 36, 37, 40 and 41 the angular rotation of saw blade 42 can be increased over the angular rotation of drum 20.

From the aforegoing discussion, it can be ascertained that motor 34 not only drives drums 20 and 21 but also drives cutting knife or saw 42. Cutting knife 42 can be equipped with a smooth or serrated cutting edge. Also the bottom surface of cutting knife 42 can be coated with an abrasive or equipped with other cutting means that will make it perform a milling operation. In operation, the peripheral sharpened edge of knife 42 will pass through the moile 68 and completely sever it from container 43. The severed top surface of container 43 must then pass beneath the bottom flat surface of knife 42. The bottom surface of knife 42 then performs a milling operation on the top finish area of container 43.

Figure 2:
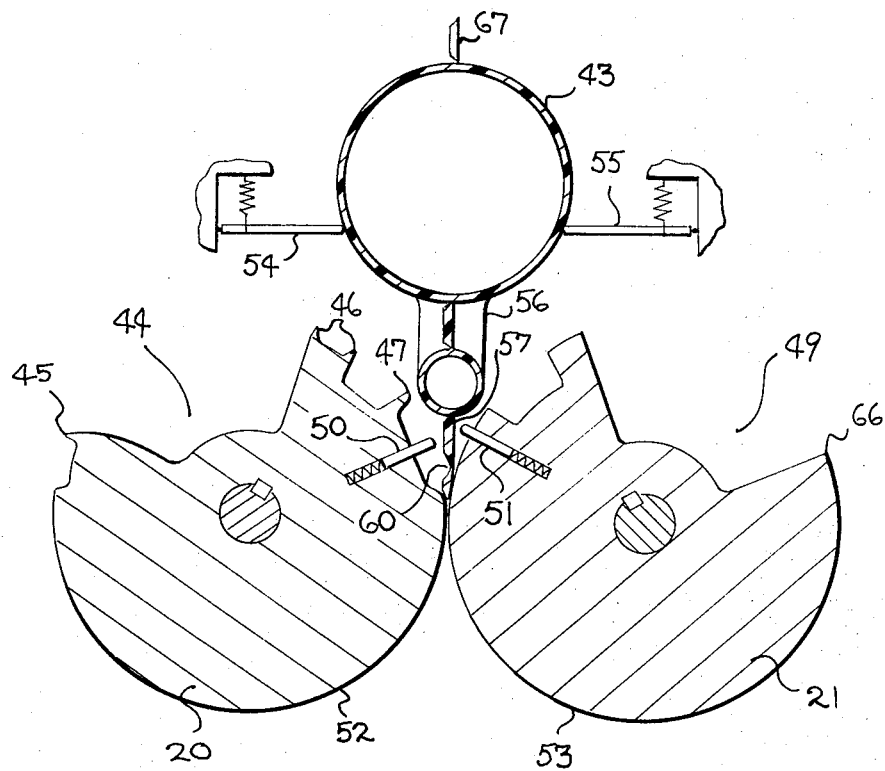
FIG. 2 is a sectional view showing a container advancing toward the cutters.

Attention is now directed to FIG. 2 which shows a cross-sectional view of the drums 20 and 21.

Drum 20 is actually a rolling cutter drum while drum 21 is a rolling flash support drum. Drum 20 contains a reentrant portion 44 with cutting surfaces 45 and 46 located on either side thereof. Cutting surface 46 is of annular configuration and is adjacent to cutting surface 47.

Drum 21 coacts with drum 20 and serves as a backup for cutting surfaces 45, 46 and 47. Drum 21 also contains a reentrant portion 49 that coincides with reentrant portion 44 of drum 20 as both drums 20 and 21 rotate in synchronous fashion. Both drums 20 and 21 contain detents 50 and 51 positioned so that the ends thereof protrude beyond the external peripheral surfaces 52 and 53. Positioned adjacent to drums 20 and 21 are spring loaded retainer bars 54 and 55. The bars 54 and 55 are pivotably anchored at one end so that under the influence of a load at the free end thereof they will deflect.

Container 43 is shown in FIG. 2 as it approaches drums 20 and 21. The handle 56 of container 43 has been oriented so that it is in a leading position. The orienting of containers 43 is accomplished by apparatus (not shown) or by manual means. FIG. 2 also shows in section the flash material that is attached to container 43. As an inherent part of the blow molding process by which container 43 is manufactured, flash material exists at several portions of the container. The flash in this particular instance does play an important part toward the successful operation of the present invention. Because handle 56 is offset from the central longitudinal axis of the container 43 there will be a considerable amount of flash material 57 attached on the outermost side. The dies are tooled not only to form a handle 56 on container 43, but to also create a depression or notch 60 in flash 57.

During operation of the present invention, containers 43 are fed handle first to retainer bars 54 and 55. The container is then restrained against further advancement until detent 50 of drum 20 intersects and engages with notch 60 of flash material 57. As soon as detent 50 is firmly positioned within notch 60, detent 51 closes behind detent 50 and provides an additional lock on the flash material 57. Thus as drums 20 and 21 rotate in unison and in opposite directions, detents 50 and 51 provide a positive mechanism for pulling container 43 toward drums 20 and 21. The positive force applied by detents 50 and 51 is great enough to overcome the counter force that is applied to container 43 by retainer bars 54 and 55. Of course it is within the purview of the present invention to provide conveyor 17 with cup-shaped pockets for holding, spacing, and propelling containers 43 into the vicinity of drums 20 and 21. This particular mode of transporting containers 43 could be utilized either with or without the aid of pins 50 and 51.

Figure 3:
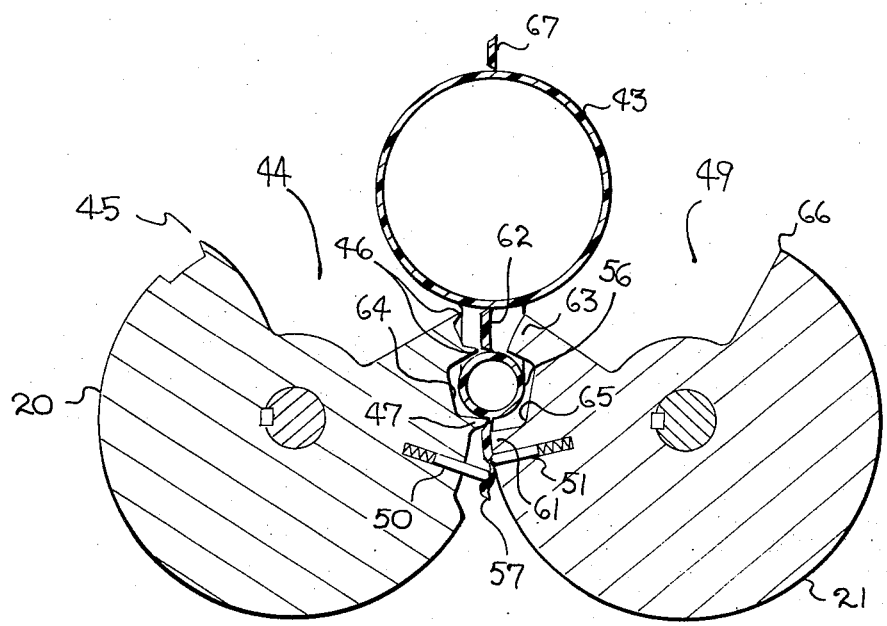
FIG. 3 is a sectional view showing the drums in a cutting position.

In FIG. 3, which is a sectional view through drums 20 and 21 and the container 43, additional rotation of the drums is shown. At this particular stage of rotation detents 50 and 51 have rotated through their closest point of contact and are ready to relinquish their grip on flash material 57. Just prior to the releasing of flash material 57, it has been severed from handle 56 by cutting surface 47 which has rotated into a position where its sharp external surface has penetrated completely flash material 57.

Since the removal of the flash material from handle 56 must be accomplished very close to the handle surface a flash support shoulder 61 on drum 21 rotates into engagement with cutting surface 47 of drum 20.

Additional rotation of drums 20 and 21 bring cutting surface 46 into position for severing the flash material 62. Coacting with cutting surface 46 is flash support anvil 63 which serves as a positive back up for cutting surface 46. The positive mating of cutting surface 46 and back up anvil 63 assures a clean cut on the handle portion of the container 43.

Drums 20 and 21 have clearance grooves 64 and 65 as shown in FIG. 3. Groove 64 is positioned between cutting surfaces 46 and 47 of drum 20. Groove 65 which mates with groove 64 is located between shoulder 61 and anvil 63 of drum 21. The configuration of grooves 64 and 65 are curved to match the contour of handle 56.

As previously pointed out, the bottle 43 is pulled into the proper position by the action of detents 50 and 51 as they grasp flash material 57. This forward pull on container 43 no longer exists after flash material 57 is severed from the handle portion of the container 43. The container 43 however may be advanced by the force applied by the side walls of cutting surface 46 and anvil 63. Further rotation of drums 20 and 21 cause container 43 to be moved forward to a position where reentrant portions 44 and 49 encompass the sides of the container.

Continued rotation of drums 20 and 21 bring cutting surface 45 of drum 20 into engagement with the trailing edge 66 of drum 21. In this manner, flash material 67 is cut from container 43. It can be ascertained that the present invention has heretofore been described in terms of removing the flash material from a container by severing it therefrom by the cutting action of surfaces 45, 46 and 47. It is to be understood that the present invention could be utilized to stamp or knock out flash material that has been previously scored or partially cut by the action of the molds in which the bottle was blown.

Figure 4:
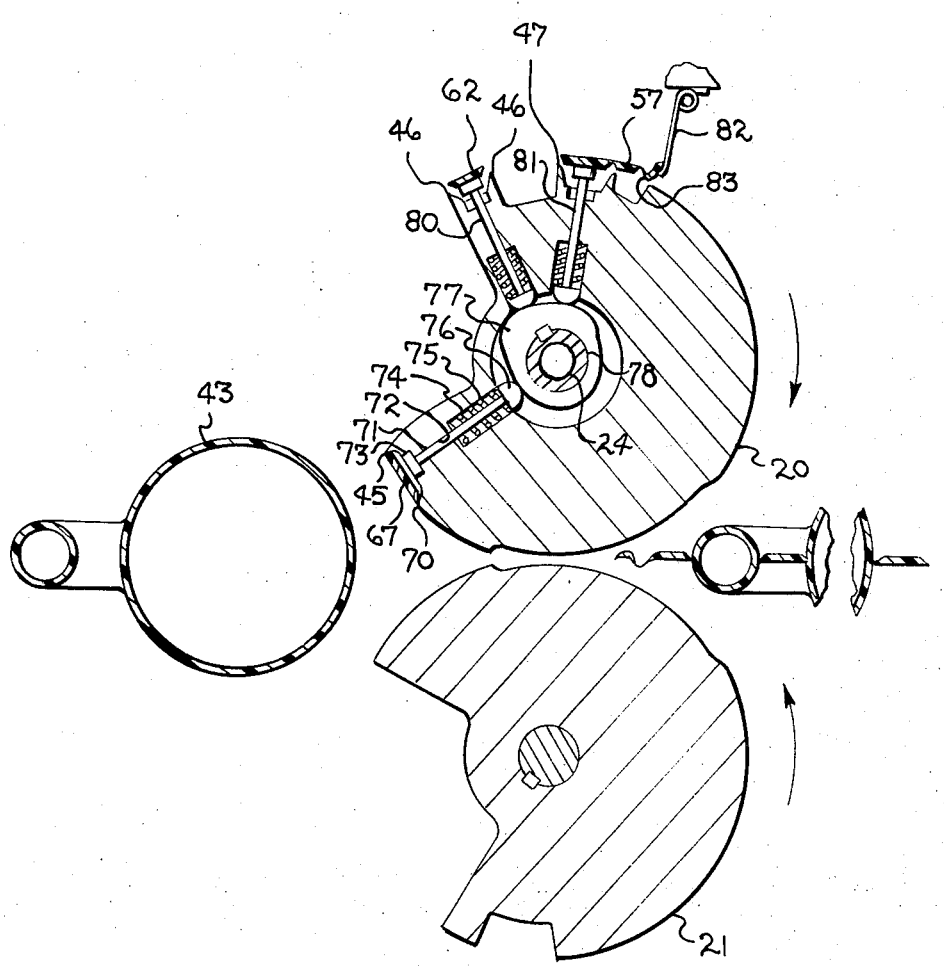
FIG. 4 is a sectional view showing the container after it has been deflashed.

FIG. 4 shows the completely deflashed container 43 after it has been released from drums 20 and 21. FIG. 4 also shows a sectional view of the release mechanism for aiding in the removal of severed plastic material from the confinement of cutting surfaces 45, 46 and 47. As can be viewed in FIG. 4, plastic waste material 67 will be retained in the space between cutting surface 45 and edge 70 of drum 20. Likewise, flash material 62 will be retained between cutting surfaces 46. The leading portion of flash material 57 will be adhered between cutting surface 47 and detent 50. To aid in the positive removal of flash material 57, 62 and 67 a series of ejector pins have been installed within drum 20. Ejector pin 71 is contained within chamber 72 of drum 20. Chamber 72 is aligned in a radial direction and perpendicular to the rotational axis of drum 20. The end of ejector pin 71 most remote from the center of drum 20 is equipped with an enlarged head 73. Chamber 72 is of increased diameter at the section 74 nearest the center of drum 20. The increased diameter of chamber 72 accommodates compression spring 75 which is biased between the end wall of chamber 72 and the radially outward surface of cam follower 76. Thus it becomes evident that pin 71 remains in the retracted position until the force of spring 75 is overcome. Cam follower 76 coacts with stationary cam 77 which is mounted within drum 20. The stationary cam 77 is mounted on an outer segment 78 of shaft 24. The outer segment 78 of shaft 24 is immobilized in plate 22. As drum 20 rotates ejector pin 71 moves to an outward position thus freeing the waste material from the cutting surfaces. FIG. 4 shows ejector pins 80 and 81 in an extended position thus removing flash material 62 and 57.

Since it is imperative that all of the waste material be removed from the cutting surfaces of drum 20 with each revolution, a stationary flash remover 82 is positioned so that its free end 83 rides along the surface of drum 20. If the unwanted flash material is not removed by ejector pins 71, 80, and 81, then stationary flash remover 82 will aid in complete waste removal.

It has been pointed out in the above-description that plastic containers can be adequately deflashed without the application of forces that would ultimately lead to deformation of the container.

What is claimed is:

1. An apparatus for severing unwanted flash material from a plastic container including a pair of rotatable drums mounted on longitudinally aligned parallel oriented shafts that are journalled on frame means, said shafts connected to power means for the rotation of said drums, at least one of said drums containing a plurality of radially aligned cutting surfaces, at least one of said drums containing back up structure to coact with said cutting surfaces, means attached to said drums to control the advancement of said container tangentially past the cutting surfaces of said drums, severing means coacting with said drums and coupled thereto for severing the moile section of said container.

2. An apparatus for severing unwanted flash material from a plastic container including a cutting drum and a back up drum mounted on longitudinally aligned parallel oriented shafts that are journaled on frame means, said drums in juxtaposed relationship one with the other, said cutting drum containing a plurality of radially extending arcuately spaced cutting surfaces, said back up drum containing a plurality of anvils arcuately spaced to coact with said cutting surfaces, reentrant sections formed in said drums to accommodate a container as it moves tangentially through the space between said drums, means attached to said drums for advancing a container at a substantially uniform rate, power means mounted on said frame and coupled to said drums to control the rotation thereof, and means coupled to said power means for severing the moile from said container.

3. An apparatus as claimed in claim 2 wherein ejection means is provided adjacent the cutting surfaces on said cutting drum to aid in the removal of severed waste material.

4. An apparatus as claimed in claim 2 wherein cam means is provided to coact with ejection means associated with said cutting drum.

5. An apparatus as claimed in claim 2 wherein the means for severing the moil from the container is in the form of a revolving blade.

6. An apparatus as claimed in claim 2 wherein the means for initially advancing the containers through the space between the drums is in the form of detents located in said drums.

7. An apparatus for severing unwanted flash material from a plastic container including a cutting drum and a back up drum mounted on longitudinally aligned parallel oriented shafts that are journaled from frame means, said drum mounted in spaced apart relationship with one another so that their peripheries define a common tangential path, said cutting drum containing a plurality of radially extending arcuately spaced cutting surfaces that work in conjunction with a plurality of anvil surfaces on said back up drum, said drums containing spaced apart reentrant sections to accommodate the parts of said container as it moves through the space between said drums, means attached to said drums for advancing a container through the space between said drums, power means mounted on said frame and coupled to said drums to rotate the cutting drum in one direction and the back up drum in the opposite direction, means coupled to said power means for severing a moile from said container, conveyor means for delivering containers to said drums, and means to meter containers to said drums.

8. The method of removing waste material from a container including the steps of:

a. positioning a container with waste material attached thereon in tangential alignment with a plurality of waste cutting drums, b. engaging a portion of the waste material on said container to advance the container toward said drums, c. rotating said drums to bring cutting surfaces one at a time into engagement with the waste material on said container, and d. discharging said container from said cutting drums.

9. The method of removing waste material from a container including the steps of, a. positioning a container with waste material attached thereon in tangential alignment with the handle thereof in alignment and facing a pair of juxtaposed waste cutting drums, b. engaging a portion of the waste material protruding from said handle between said drums, c. rotating said drums and simultaneously advancing said container through a plurality of cutting surfaces to sever the waste material from the container, and d. discharging said container from said cutting drums.

10. A method as claimed in claim 9 wherein the moil section of said container is removed by a cutting blade that acts in unison with said drums.

* * * * *